(12) United States Patent
Gilbert

(10) Patent No.: US 8,096,104 B2
(45) Date of Patent: Jan. 17, 2012

(54) FLUIDIC VECTORING FOR EXHAUST NOZZLE

(75) Inventor: David C. Gilbert, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1235 days.

(21) Appl. No.: 11/809,297

(22) Filed: May 31, 2007

(65) Prior Publication Data

US 2008/0295481 A1    Dec. 4, 2008

(51) Int. Cl.
*F02K 1/00* (2006.01)
*F02K 1/28* (2006.01)

(52) U.S. Cl. ..................... 60/231; 239/265.17

(58) Field of Classification Search ............. 60/231, 60/230, 229, 228; 239/265.17, 265.19, 265.23; 137/625.3, 625.33
See application file for complete search history.

(56) References Cited

U.S. PATENT DOCUMENTS

| | | | |
|---|---|---|---|
| 3,354,645 A * | 11/1967 | Hsia ................................ 60/204 |
| 3,749,317 A * | 7/1973 | Osofsky ..................... 239/265.19 |
| 3,794,063 A * | 2/1974 | Carroll et al. ............ 137/505.26 |
| 5,427,146 A * | 6/1995 | Bakken et al. ............. 137/625.3 |
| 5,619,851 A | 4/1997 | Johnson et al. ................. 60/267 |
| 5,687,907 A | 11/1997 | Holden ..................... 239/265.35 |
| 5,706,650 A | 1/1998 | Thayer ............................ 60/231 |
| 6,112,513 A | 9/2000 | Catt et al. ........................ 60/204 |
| 6,145,299 A | 11/2000 | Fasano ............................ 60/204 |
| 6,298,658 B1 | 10/2001 | Bak ................................. 60/231 |
| 6,336,319 B1 | 1/2002 | Koshoffer ....................... 60/204 |
| 6,354,074 B1 | 3/2002 | Jones et al. ..................... 60/204 |
| 7,155,898 B2 | 1/2007 | Sota, Jr. et al. ................ 60/230 |
| 2005/0091964 A1* | 5/2005 | Curtelin et al. ................ 60/262 |
| 2006/0242942 A1* | 11/2006 | Johnson ......................... 60/228 |

* cited by examiner

*Primary Examiner* — Louis Casaregola
*Assistant Examiner* — Andrew Nguyen
(74) *Attorney, Agent, or Firm* — Carlson Gaskey & Olds, P.C.

(57) ABSTRACT

An exhaust nozzle assembly provides fluidic thrust vectoring of the primary stream to enhance aircraft maneuverability. The exhaust nozzle assembly includes a cooling air passage that supplies cooling air. A vector opening injects cooling airflow into the exhaust passage to the primary stream. A cover plate is movable to partially block the vector openings and adjust the location of injection of the cooling airflow into the exhaust passage.

15 Claims, 6 Drawing Sheets

FLUIDIC VECTORING FOR EXHAUST NOZZLE

BACKGROUND OF THE INVENTION

1. Field of the Invention

This invention relates generally to exhaust nozzles for jet engines. More particularly, this invention relates to fluidic vectoring control for an exhaust nozzle.

2. Description of the Related Art

A jet engine includes a compressor providing high-pressure air to a combustor. Fuel and air are mixed within the combustor and ignited, resulting in high-speed exhaust gas that drives the turbine of the jet engine. The exhaust gas exits the jet engine through an exhaust nozzle and generates thrust that propels the aircraft. The exhaust nozzle directs the exhaust gas to optimize thrust produced by the jet engine.

Due to the extreme temperature at which exhaust gases exit through the exhaust nozzle, a layer of cooling air is typically provided to the exhaust nozzle by a plurality of openings within the nozzle liner. The layer of cooling air thermally insulates the surface of the exhaust nozzle from the exhaust gas.

Aircraft movement, such as, for example, about the yaw axis, can be accomplished through various methods and combinations of methods including control surfaces, such as a rudder, and directing exhaust gas. One method of directing exhaust gas is via movement of the exhaust nozzle. The drawback of movement of the exhaust nozzle is that it requires complicated mechanisms and control systems.

Another method of directing exhaust gas utilizes high-pressure bleed air directed along different points of the exhaust nozzle. Unfortunately, such a device typically requires complicated tubing and channeling in order to communicate air to the desired location in the exhaust nozzle.

Thus, there is a need for fluidic vectoring control that is simple, efficient and flexible in its applications to various exhaust nozzles. There is a further need for such a device that allows for quick response time upon actuation.

BRIEF SUMMARY OF THE INVENTION

In one aspect, an exhaust nozzle assembly is provided comprising an exhaust passage, an airflow passage for cooling air, a vector opening in communication with the airflow passage and the exhaust passage, and a cover movable for blocking a portion of the flow of cooling air from the airflow passage into the exhaust passage. The cover moves in a straight line.

In another aspect, an exhaust nozzle assembly is provided comprising an exhaust passage, an airflow passage for cooling air, a vector opening in communication with the airflow passage and the exhaust passage, and a cover movable for blocking a portion of the flow of cooling air from the airflow passage into the exhaust passage. The cover has a plate opening that selectively unblocks the portion of the flow.

In another aspect, a method of directing an exhaust gas path is provided comprising the steps of, but not limited to, providing cooling air to an exhaust nozzle, injecting the cooling air into a primary stream of the exhaust nozzle, and adjusting a position of the injecting with respect to the primary stream via a linear movement of a cover plate that blocks a portion of flow of the cooling air.

The vector opening can have a total flow area that remains substantially constant over an entire range of motion of the cover. The cover may move along a centerline of the exhaust nozzle. The exhaust passage has a trailing edge and the vector opening may be in proximity to the trailing edge. The vector opening can be a plurality of vector openings and the cover may have a plurality of plate openings. The size and shape of each of the plurality of vector openings can be equal to the size and shape of each of the plurality of plate openings.

The plurality of plate openings can be a first set of plate openings and a second set of plate opening, wherein the first set of plate openings is positioned along an upstream portion of the cover and wherein the second set of plate openings is positioned along a downstream portion of the cover. The assembly can also have an actuator arm connected to the cover for selectively moving the cover with respect to the vector opening. The injection of the cooling air into the primary stream may provide yaw vectoring.

Accordingly, the exhaust nozzle assembly of this invention provides thrust vectoring of the primary stream without complex piping and conduits.

These and other features of the present invention can be best understood from the following specification and drawings, the following of which is a brief description.

BRIEF DESCRIPTION OF THE DRAWINGS

Other uses and advantages of the present invention will become apparent to those skilled in the art upon reference to the specification and the drawings, in which.

DETAILED DESCRIPTION OF THE INVENTION

Figure 1:
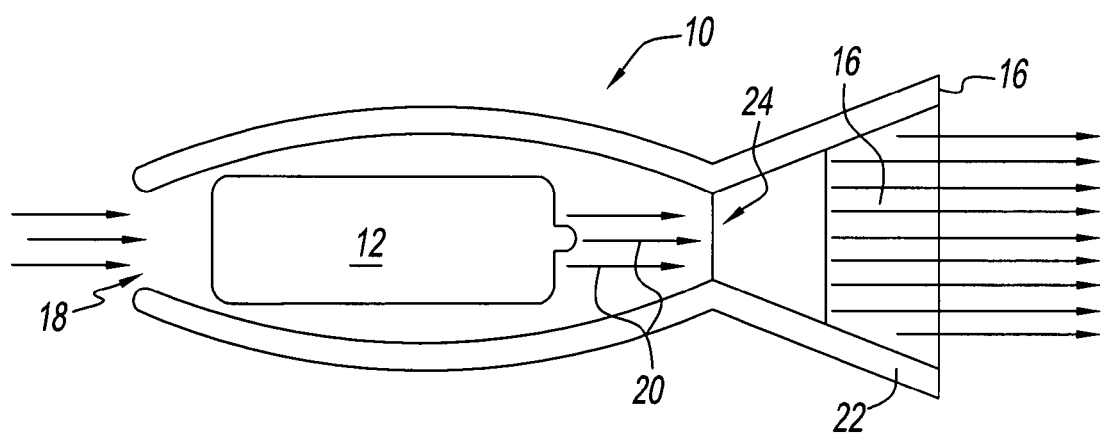
FIG. 1 is a schematic representation of a jet engine assembly having a nozzle and cover plate in accordance with an exemplary embodiment.

Referring to FIG. 1, a jet engine assembly 10 is shown and includes a propulsion system 12 that intakes air from an inlet 18 mixes it with fuel and generates a primary stream 20 that provides a desired thrust force. The primary stream 20 exits through an exhaust nozzle assembly 22 that includes an exhaust passage 24. The exhaust passage 24 includes a nozzle throat 14 for accelerating the primary stream 20. The exhaust nozzle assembly 22 provides for the fluidic thrust vectoring of the primary stream 20 to enhance aircraft maneuverability.

Figure 2:
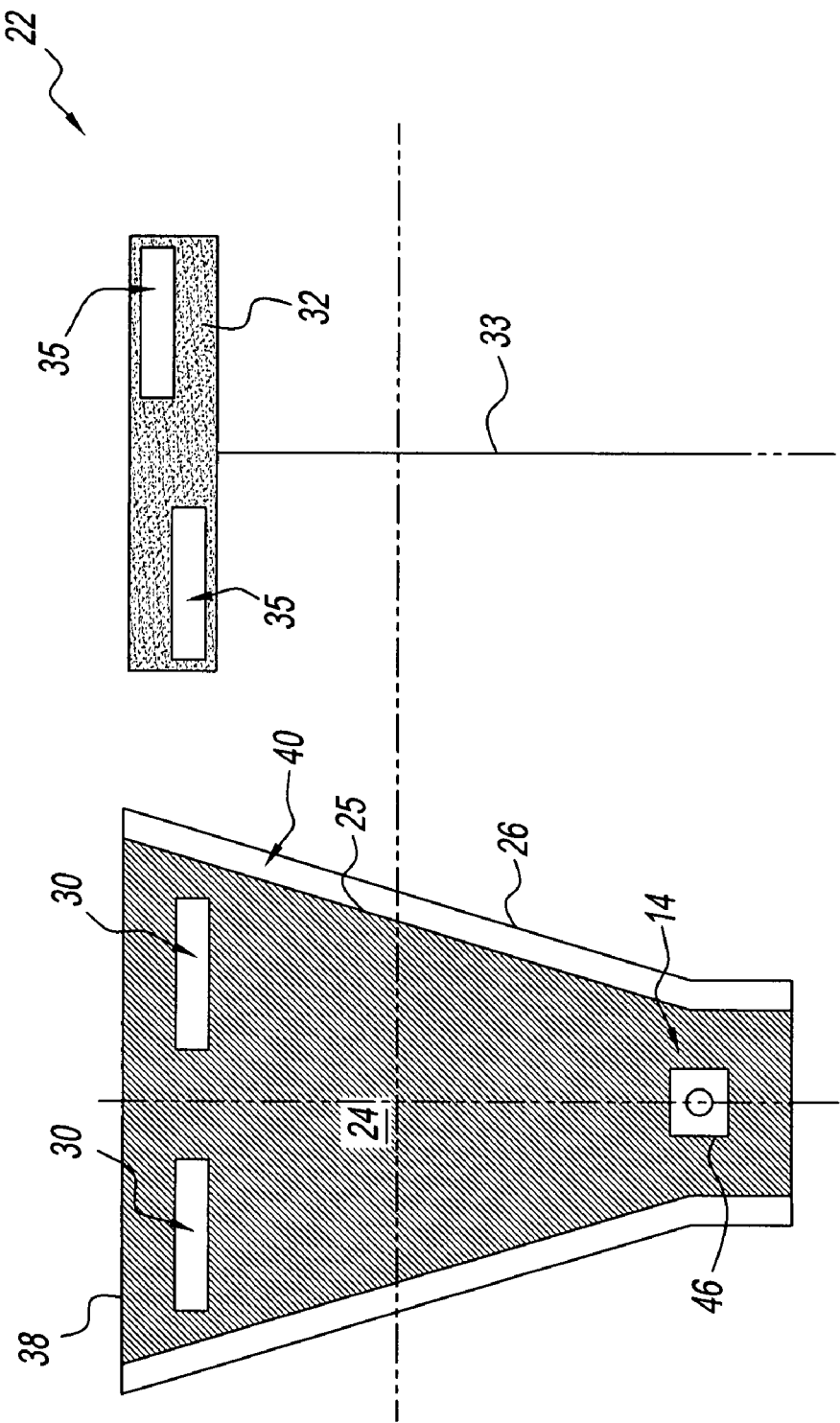
FIG. 2 is a schematic exploded plan view of a nozzle and cover plate used in the assembly of FIG. 1.

Referring to FIGS. 1 and 2, the exhaust nozzle assembly 22 is shown. Exhaust nozzle assembly 22 has a trailing edge 38 and is a converging/diverging nozzle. The exhaust passage 24 necks down to a smallest cross-sectional area at the nozzle throat 14, and increases in cross-sectional area from the nozzle throat 14 to the trailing edge 38. The particular shape and dimensions of the nozzle assembly 22 can be varied to obtain the performance desired.

The exhaust nozzle assembly 22 includes an inner duct wall 25 and an outer duct wall 26 spaced apart from each other to define a cooling air passage 40. The cooling air passage 40 supplies cooling air 44 (shown in FIGS. 3 through 5) that can be used to direct the exhaust gas flow path as will be described later in greater detail. The inner duct wall 25 can include a plurality of cooling holes (not shown) which when supplied with cooling air 44 via air passage 40 creates an insulating layer of air along the inner duct wall 25. The cooling air 44 insulates the inner duct wall 25 from the high temperature of the primary stream 20. The volume and rate of cooling air 44 may be fixed for all operating parameters of the propulsion system 12 thereby preventing undesirable fluctuations in propulsion system 12 performance.

The exhaust nozzle assembly 22 includes one or more vector openings 30 that inject cooling air 44 into the exhaust passage 24. In this exemplary embodiment, there are first and second vector openings 30 but as will be seen in other exemplary embodiments, the present disclosure contemplates the use of other numbers of vector openings. The angle of introduction typically is normal to the primary stream 20 but alternative angles are also contemplated by the present disclosure. The vector openings 30 are selectively sealed or blocked by a cover plate 32. The cover plate 32 is movable with respect to the vector openings 30 to adjust the location that cooling air 44 is injected into the primary stream 20. An actuator arm 33 is attached to the cover plate 32 and is actuated by a drive 46 for movement of the cover plate 32. While the exemplary embodiment describes the actuator arm 33 and drive 46 for moving the cover plate 32, the present disclosure contemplates alternative drive mechanisms and methods.

Figure 4:
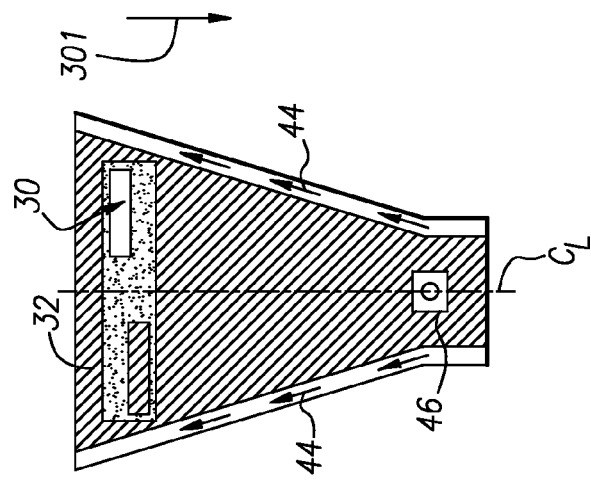
FIG. 4 is a schematic plan view of the nozzle and cover plate of FIG. 2 in a first or left vectoring position.
Figure 3:
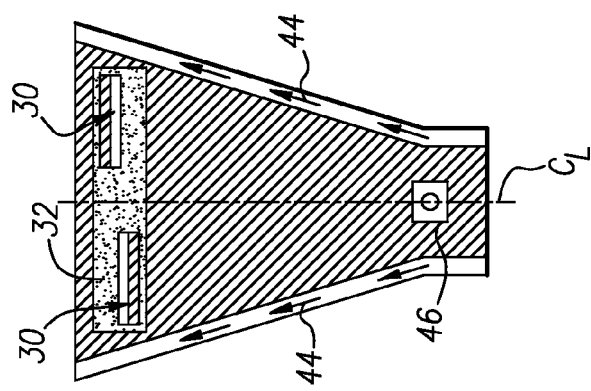
FIG. 3 is a schematic plan view of the nozzle and cover plate of FIG. 2 in a neutral vectoring position.
Figure 5:
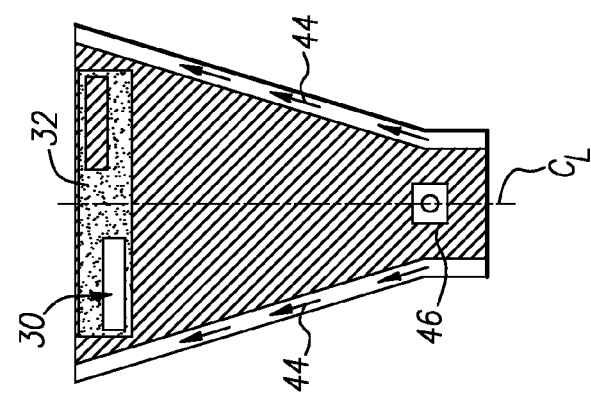
FIG. 5 is a schematic plan view of the nozzle and cover plate of FIG. 2 in a second or right vectoring position.

As shown in FIGS. 3 through 5, the cover plate 32 preferably moves along the center line $C_L$ of the nozzle to selectively seal or open the vector openings 30. However, alternative positionings are contemplated by the present disclosure. Preferably, the vector openings 30 are positioned near or in proximity to the trailing edge 38 to maximize the yaw vectoring effectiveness of the primary stream 20. The cover plate 32 has plate openings 35 that have substantially the same size and shape as the vector openings 30. The plate openings 35 are equal in number to the vector openings 30 but are positioned along upstream and downstream portions of the cover plate 32 for reasons which will now be described in greater detail.

As shown in FIG. 3, the cover plate 32 can be positioned in a neutral vectoring position so that the amount of vector opening 30, i.e., the flow area, is equal in both the first and second vector openings. The neutral vectoring position is accomplished by positioning the plate openings 35 so as to unblock approximately half of each vector opening 30.

As shown in FIG. 4, as the cover plate is moved upstream along the center line $C_L$ as shown by arrow 300, the first vector opening 30 is further opened or unblocked while the second vector opening is closed or blocked. The amount of flow area in this first or left vectoring position is substantially equal to the amount of flow area in the neutral vectoring position. As the cover plate 32 is moving along the centerline $C_L$, the amount of flow area remains substantially constant but the injection position of the cooling air 44 with respect to the gas stream 20 is being changed.

As shown in FIG. 5, as the cover plate is moved downstream along the center line $C_L$ as shown by the arrow 301, the second vector opening 30 is further opened or unblocked while the first vector opening is closed or blocked. The amount of flow area in this second or right vectoring position is substantially equal to the amount of flow area in the neutral vectoring position, which is also substantially equal to the amount of flow area in the first or left vectoring position. As the cover plate 32 is moving along the centerline $C_L$, the amount of flow area remains substantially constant but the injection position of the cooling air 44 with respect to the gas stream 20 is being changed.

Figure 8:
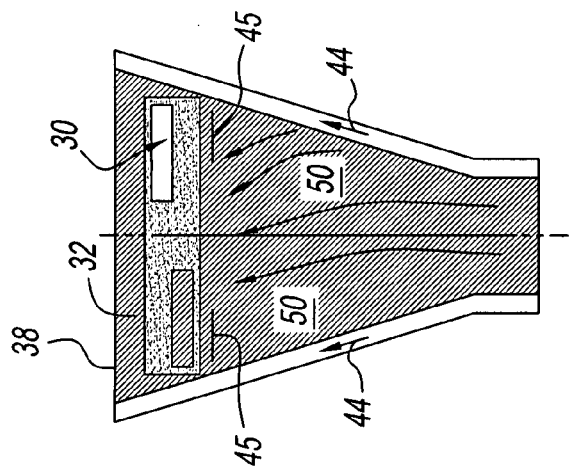
FIG. 8 is a schematic plan view of the nozzle and cover plate of FIG. 2 in the right vectoring position showing a representative gas exhaust path.
Figure 6:
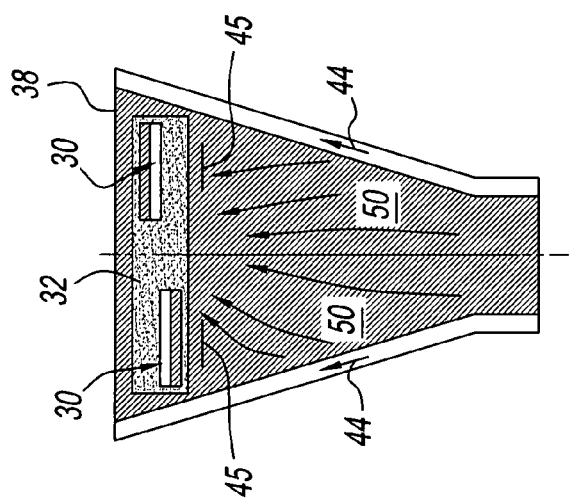
FIG. 6 is a schematic plan view of the nozzle and cover plate of FIG. 2 in the neutral vectoring position showing a representative gas exhaust path.
Figure 7:
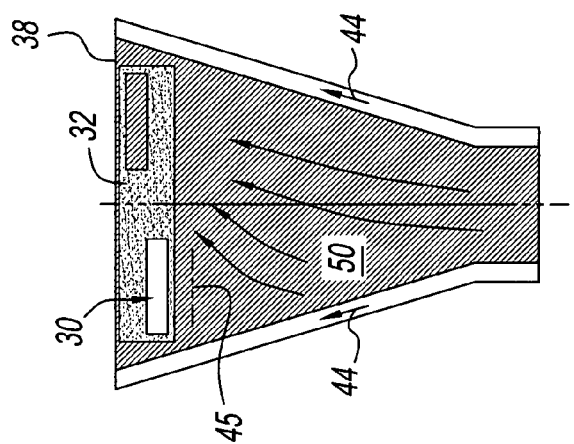
FIG. 7 is a schematic plan view of the nozzle and cover plate of FIG. 2 in the left vectoring position showing a representative gas exhaust path.

Referring to FIGS. 6 through 8, the effect of changing the position of the injected cooling air 44 by the upstream and downstream movement of the cover plate 32 is shown. Vectoring of the primary stream 20 is accomplished by the injection of the cooling air 44 through the vector openings 30 and into the exhaust passage 24. The cooling air 44 creates a barrier, or blocked area schematically shown by dashed lines 45 across the trailing edge 38, that restricts the flow of the primary stream 20. The resistance to airflow in the blocked areas 45 causes the primary stream to move toward areas of less resistance. The primary stream 20 reacts by bending or flowing to the area of least resistance where no barrier to flow exists. The cooling air 44 injected into the exhaust passage 24 creates the barrier by generating high-pressure regions 50. The high-pressure regions 50 create the resistance to the flow of the primary stream 20. The resistance caused by the high-pressure regions 50 does not prevent flow, but provides a resistance to flow of the primary stream that redirects a substantial portion of the primary stream 20.

When one of the vector openings 30 is blocked or substantially blocked, the corresponding region of the nozzle does not include cooling air 44 and therefore provides less resistance to flow than the high-pressure region 50. The primary stream 20 flows unimpeded through such a region. In the neutral vectoring position, a substantially equal amount of cooling air 44 passes through each of the first and second vector openings 30 on opposing sides of the nozzle. This results in substantially equal amounts of primary stream 20 being redirected toward the center of the exhaust nozzle 22 that in turn results in no directional vectoring of the primary stream 20.

In the first or left vectoring position, the cooling air 44 passes through the first or left vector opening 30. This results in the primary stream 20 being redirected toward the opposite side of the exhaust nozzle 22. In the second or right vectoring position, the cooling air 44 passes through the second or right vector opening 30. This results in the primary stream 20 being redirected toward the opposite side of the exhaust nozzle 22.

As described above, a full range of vectoring is available by movement of the cover plate 32. The configuration of the vectoring openings 30 with respect to the plate openings 35 allows for redirection of the primary stream 20 while maintaining the same flow area. The movement of the cover plate 32 is a small linear movement via the actuator arm 33 that is attached to the cover plate 32 and actuated by the drive 46. The small linear movement of the cover plate 32 allows for faster changes in vectoring control and a more responsive control system. Cooling air 44 selectively exiting the vector openings 30 generate the high-pressure region 50 to one side of the exhaust nozzle assembly 22 thereby directing a majority of the flow of the primary stream 20 to exit one side of the exhaust nozzle assembly 22. This directional control of the primary stream 20 provides the desired directional thrust utilized to enhance maneuverability of the aircraft.

Figure 9:
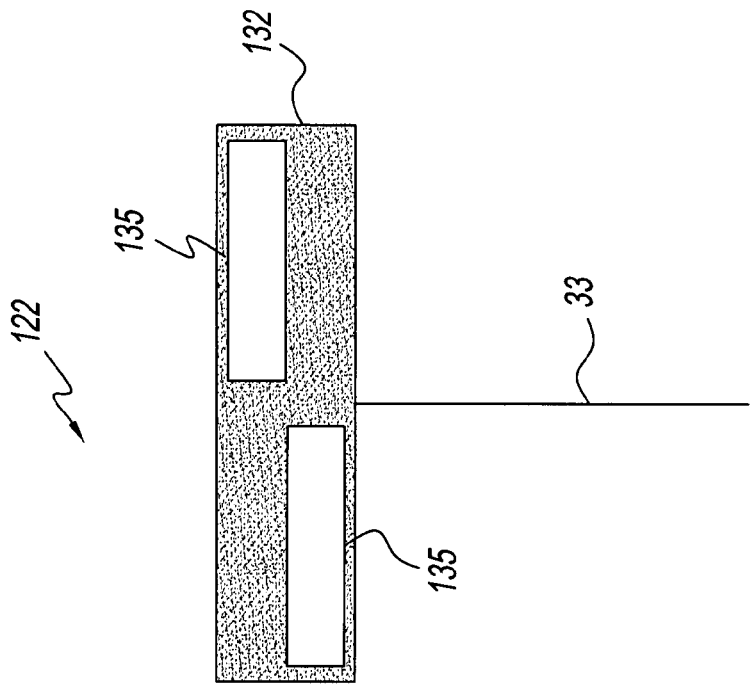
FIG. 9 is a schematic exploded plan view of a nozzle and cover plate in accordance with another exemplary embodiment.
Figure 9:
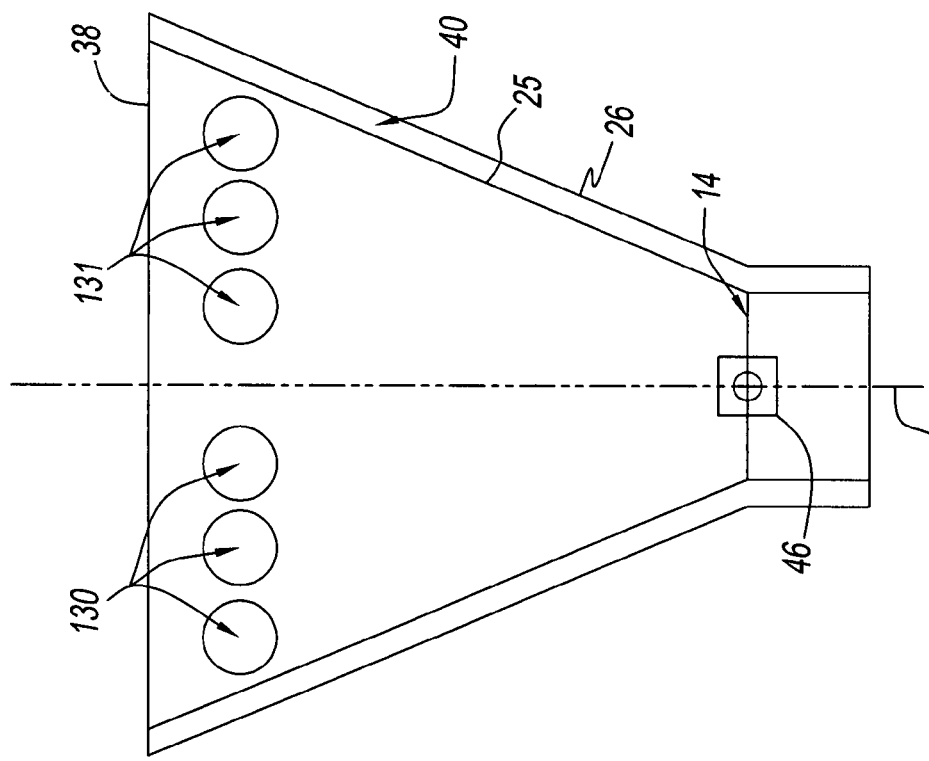

Referring to FIG. 9, another exemplary embodiment of the nozzle assembly is shown and generally represented by reference numeral 122. Similar features as the exemplary embodiment of FIGS. 1 through 8, are represented by the same reference numerals. The exhaust nozzle assembly 122 includes inner duct wall 25 and outer duct wall 26 spaced apart from each other to define cooling air passage 40.

The exhaust nozzle assembly 122 includes vector openings 130, 131 that inject cooling air 44 into the exhaust passage 24. In this exemplary embodiment, there are a first set of vector openings 130 and a second set of vector openings 131 but as will be seen in other exemplary embodiments, the present disclosure contemplates the use of other numbers of vector openings. The angle of introduction typically is normal to the primary stream 20 but alternative angles are also contemplated by the present disclosure. The vector openings 130, 131 are selectively sealed or blocked by a cover plate 132. The cover plate 132 is movable with respect to the vector openings 130, 131 to adjust the location that cooling air 44 is injected into the primary stream 20. An actuator arm 33 is attached to the cover plate 132 and is actuated by a drive 46 for movement of the cover plate 132. While the exemplary embodiment describes the actuator arm 33 and drive 46 for moving the cover plate 132, the present disclosure contemplates alternative drive mechanisms and methods.

The cover plate 132 preferably moves along the center line $C_L$ of the nozzle to selectively seal or open the vector openings 130. Preferably, the vector openings 130 are positioned near the trailing edge 38 to maximize the yaw vectoring effectiveness of the primary stream 20. However, alternative positionings are contemplated by the present disclosure. The cover plate 132 has plate openings 135 shaped to maintain the same open area through the vector openings 130. The plate openings 135 are positioned along upstream and downstream portions of the cover plate 132. The vector openings 130, 131 and have non-rectangular shapes and the plate openings 135 have rectangular shapes but function as described above with respect to the embodiment of FIGS. 1 through 8 to change the position of the injected cooling air 44 and thus direct the primary stream 20. The circular shape of the vector openings 130, 131 and rectangular plate openings 135 allow for control of the amount of flow area over the range of cover plate positions as well as control of the rate of change of the re-directing of the primary stream 20.

Figure 10:
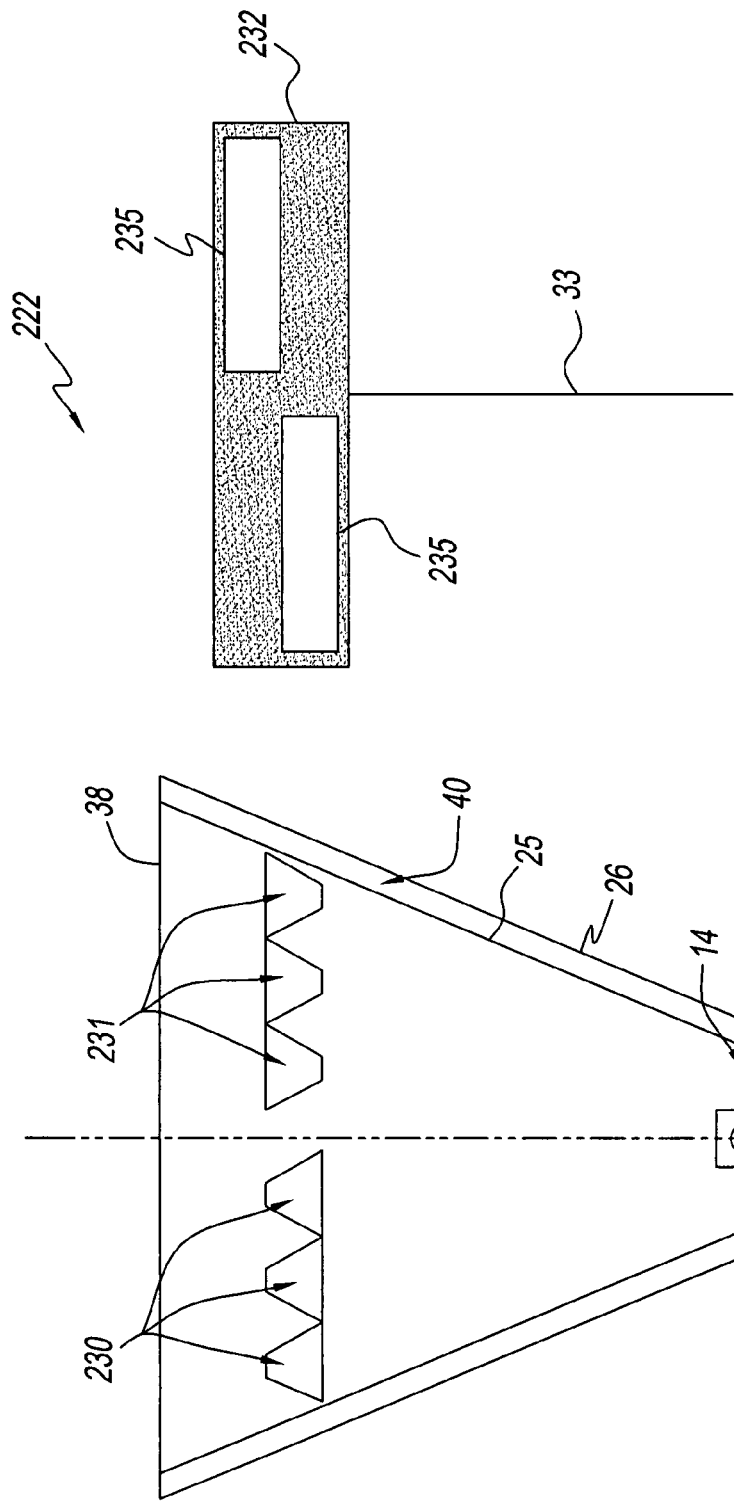
FIG. 10 is a schematic exploded plan view of a nozzle and cover plate in accordance with another exemplary embodiment.

Referring to FIG. 10, another exemplary embodiment of the nozzle assembly is shown and generally represented by reference numeral 222. Similar features as the exemplary embodiment of FIGS. 1 through 8, are represented by the same reference numerals. The exhaust nozzle assembly 222 includes inner duct wall 25 and outer duct wall 26 spaced apart from each other to define cooling air passage 40.

The exhaust nozzle assembly 222 includes one or more vector openings 230, 231 that inject cooling air 44 into the exhaust passage 24. In this exemplary embodiment, there are a first set of vector openings 230 and a second set of vector openings 231 but as will be seen in other exemplary embodiments, the present disclosure contemplates the use of other numbers of vector openings. The angle of introduction typically is normal to the primary stream 20 but alternative angles are also contemplated by the present disclosure. The vector openings 230, 231 are selectively sealed or blocked by a cover plate 132. The cover plate 132 is movable with respect to the vector openings 230, 231 to adjust the location that cooling air 44 is injected into the primary stream 20. An actuator arm 33 is attached to the cover plate 232 and is actuated by a drive 46 for movement of the cover plate 232. While the exemplary embodiment describes the actuator arm 33 and drive 46 for moving the cover plate 232, the present disclosure contemplates alternative drive mechanisms and methods.

The cover plate 232 preferably moves along the center line $C_L$ of the nozzle to selectively seal or open the vector openings 230, 231. Preferably, the vector openings 230, 231 are positioned near the trailing edge 38 to maximize the yaw vectoring effectiveness of the primary stream 20. The cover plate 232 has plate openings 235 shaped to maintain the same open area through the vector openings 230, 231. The plate openings 235 are positioned along upstream and downstream portions of the cover plate 232. The vector openings 230, 231 have a non-rectangular shape and the plate openings 235 have a rectangular shape but function as described above with respect to the embodiment of FIGS. 1 through 8 to change the position of the injected cooling air 44. The trapezoidal shape of the vector openings 230, 231 and rectangular plate openings 235 allow for control of the amount of flow area over the range of cover plate positions as well as control of the rate of change of the re-directing of the primary stream 20.

In the above exemplary embodiments, cover plates 32, 132 and 232 can be used with various shapes and/or curvatures of nozzle liners. The shape and orientation of the vector openings 30, 130, 131, 230, 231 and plate openings 35, 135, 235 can be varied to facilitate the vectoring control and directing of the primary stream 20. Smaller vector openings 30, 130, 131, 230, 231 can be utilized which facilitates their sealing by cover plates 32, 132, 232 to prevent unwanted leakage.

The injection of cooling air 44 as described in this invention is utilized to provide thrust vectoring that enhances movement about a yaw axis. Although the present disclosure contemplates positioning of the vector openings 30, 130, 131, 230, 231 within side walls of the exhaust nozzle assemblies 22, 122, 222 to provide for thrust vectoring that would enhance movement about other axes, such as the pitch and roll axis. The constant flow of cooling air 44 through the substantially constant flow area regardless of the position of cover plate 32 is desirable because no variation is encountered by the propulsion system 12. The exhaust nozzle assemblies 22, 122, 222 of the exemplary embodiments described herein provide fluidic thrust vectoring of the primary stream that enhances aircraft maneuverability.

It should also be noted that the terms "first", "second", "right", and "left", and the like, are used herein to describe various elements. These modifiers do not imply a spatial, sequential, or hierarchical order to the modified elements unless specifically stated.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. An exhaust nozzle assembly comprising:
   an exhaust passage;
   an airflow passage for cooling air;
   a vector opening in communication with said airflow passage and said exhaust passage; and
   a cover movable for blocking a portion of said flow of cooling air from said airflow passage into said exhaust passage, wherein said cover moves in a straight line, wherein said vector opening has a total flow area and wherein said total flow area remains substantially constant over an entire range of motion of said cover.

2. The assembly of claim 1, wherein said cover moves along a center line of the exhaust nozzle.

3. The assembly of claim 1, wherein said exhaust passage comprises a trailing edge and said vector opening is in proximity to said trailing edge.

4. The assembly of claim 1, wherein said vector opening is a plurality of vector openings and said cover has a plurality of plate openings.

5. The assembly of claim 4, wherein a constant controlled area is established by the interaction between the size and shape of each of said plurality of vector openings with the size and shape of each of said plurality of plate openings.

6. The assembly of claim 4, wherein said plurality of plate openings is a first set of plate openings and a second set of plate openings, wherein said first set of plate openings is positioned along an upstream portion of said cover and wherein said second set of plate openings is positioned along a downstream portion of said cover.

7. The assembly of claim 1, further comprising an actuator arm connected to said cover for selectively moving said cover with respect to said vector opening.

8. An exhaust nozzle assembly comprising:
an exhaust passage;
an airflow passage for cooling air;
a vector opening in communication with said airflow passage and said exhaust passage; and
a cover movable for blocking a portion of said flow of cooling air from said airflow passage into said exhaust passage, wherein said cover has a plate opening that selectively unblocks said portion of said flow, wherein said vector opening has a total flow area and wherein said total flow area remains substantially constant over an entire range of motion of said cover.

9. The assembly of claim 8, wherein said cover moves in a straight line.

10. The assembly of claim 8, wherein said cover moves along a center line of the exhaust nozzle.

11. The assembly of claim 8, wherein said exhaust passage comprises a trailing edge and said vector opening is in proximity to said trailing edge.

12. The assembly of claim 8, wherein said vector opening is a plurality of vector openings and said cover has a plurality of plate openings.

13. The assembly of claim 12, wherein a constant controlled area is established by the interaction between the size and shape of each of said plurality of vector openings with the size and shape of each of said plurality of plate openings.

14. The assembly of claim 12, wherein said plurality of plate openings is a first set of plate openings and a second set of plate opening, wherein said first set of plate openings is positioned along an upstream portion of said cover and wherein said second set of plate openings is positioned along a downstream portion of said cover.

15. The assembly of claim 8, further comprising an actuator arm connected to said cover for selectively moving said cover with respect to said vector opening.

* * * * *